United States Patent
Culp et al.

(10) Patent No.: US 9,633,258 B2
(45) Date of Patent: Apr. 25, 2017

(54) HAZARD DETECTION FOR ASSET MANAGEMENT

(71) Applicant: International Business Machines Corporation, Armonk, NY (US)

(72) Inventors: James R. Culp, Towson, MD (US); Frank D. Fenhagen, IV, Baltimore, MD (US); Arun Hampapur, Norwalk, CT (US); Xuan Liu, Yorktown Heights, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/702,835

(22) Filed: May 4, 2015

(65) Prior Publication Data

US 2015/0235082 A1    Aug. 20, 2015

Related U.S. Application Data

(63) Continuation of application No. 14/504,691, filed on Oct. 2, 2014, and a continuation of application No.
(Continued)

(51) Int. Cl.
*G06K 9/00* (2006.01)
*G06K 9/52* (2006.01)

(52) U.S. Cl.
CPC ....... *G06K 9/00476* (2013.01); *G06K 9/0063* (2013.01); *G06K 9/52* (2013.01)

(58) Field of Classification Search
None
See application file for complete search history.

(56) References Cited

U.S. PATENT DOCUMENTS 6,591,188 B1 *  7/2003  Ohler ............... G01C 21/3415
                                                340/990
6,973,384 B2 * 12/2005  Zhao ................ G01C 21/3492
                                                342/357.29
(Continued)

FOREIGN PATENT DOCUMENTS

CN    101335431 A    12/2008
CN    101763605 A     6/2010
(Continued)

OTHER PUBLICATIONS

Sun et al ("Measuring the distance of Vegetation from powerlines using stereo vision", ISPRS 2006).*
(Continued)

*Primary Examiner* — Avinash Yentrapati
(74) *Attorney, Agent, or Firm* — John R. Pivnichny; Madeline F. Schiesser; Keohane & D'Alessandro PLLC

(57) ABSTRACT

An approach that detects locations of hazardous conditions within an infrastructure is provided. This approach uses satellite imagery, GIS data, automatic image processing, and predictive modeling to determine the location of the hazards automatically, thus optimizing infrastructure management. Specifically, a hazard detection tool provides this capability. The hazard detection tool comprises a detection component configured to: receive visual media containing asset location data about a set of physical assets, and hazard location data about potential hazards within a vicinity of each of the set of physical assets. The detection component further receives graphical information system (GIS) data containing asset location data about each of the set of physical assets. The hazard detection tool further comprises an analysis component configured to: analyze the visual media to determine if a hazardous condition exists for each of the set of physical assets; and apply the GIS data to the visual media to
(Continued)

determine a location of hazardous conditions within the infrastructure.

20 Claims, 5 Drawing Sheets

Related U.S. Application Data

12/955,944, filed on Nov. 30, 2010, now Pat. No. 8,929,585.

(56) References Cited

U.S. PATENT DOCUMENTS

| | | | |
|---|---|---|---|
| 7,627,453 B2 | 12/2009 | Keefe et al. | |
| 7,738,612 B2 | 6/2010 | Rafaeli | |
| 7,746,794 B2 | 6/2010 | Sink | |
| 7,873,471 B2* | 1/2011 | Gieseke | G01C 21/3415 340/995.12 |
| 8,229,769 B1* | 7/2012 | Hopkins, III | G06Q 10/0635 382/100 |
| 8,527,198 B2* | 9/2013 | Hardy | G01C 21/3415 701/409 |
| 8,700,327 B2* | 4/2014 | Cabral | G01C 21/3415 701/411 |
| 2005/0075911 A1* | 4/2005 | Craven, Jr. | G06Q 40/08 705/4 |
| 2007/0138347 A1* | 6/2007 | Ehlers | G01C 21/3461 246/1 R |
| 2007/0260401 A1* | 11/2007 | Sydor | G06Q 40/08 702/1 |
| 2008/0082348 A1* | 4/2008 | Paulus | G06Q 30/0278 705/306 |
| 2009/0043504 A1 | 2/2009 | Bandyopadhyay et al. | |
| 2009/0204245 A1 | 8/2009 | Sustaeta et al. | |
| 2010/0152910 A1 | 6/2010 | Taft | |
| 2014/0229420 A1* | 8/2014 | Green | G06Q 90/00 706/52 |

FOREIGN PATENT DOCUMENTS

| | | |
|---|---|---|
| CN | 101840541 A | 9/2010 |
| TW | 200919382 A | 5/2009 |

OTHER PUBLICATIONS

Yanli ("The Application of GIS and RS for Coastline change detection and risk assessment to enhanced sea level rise", 2002.*
Tan ("Texture edge detection by modelling visual cortical channels", 1995).*
Senthilkumaran et al ("Segmentation—A Survey of Soft Computing Approaches", 2009).*

PCT Notification of Transmittal of the International Search Report and the Written Opinion of the International Searching Authority, or the Declaration, International Application No. PCT/EP2011/069138, Date of Mailing Mar. 19, 2012, 4 pages.
Sven Fleck et al., "Smart Camera Based Monitoring System and Its Application to Assisted Living", Proceedings of the IEEE, vol. 96, No. 10, Oct. 2008, pp. 1698-1714.
Eugster et al., "UAV-Based Augmented Monitoring—Real-Time Georeferencing and Integration of Video Imagery With Virtual Globes", International Archives of Photogrammetry, Remote Sensing and Spatial Information Sciences, Beijing 2008, International Society for Photogrammetry and Remote Sensing, GB, vol. XXXVII, Jul. 3, 2008, pp. 1229-1236.
Sun et al., "Measuring the distance of vegetation from powerlines using stereo vision", ISPRS Journal of Photogrammetry & Remote Sensing 60 (2006), pp. 269-283.
Jungyul Sohn, "Evaluating the significance of highway network links under the flood damage: An accessibility approach", Transportation Research Part A 40 (2006), Copyright 2005 Elsevier Ltd., pp. 491-506.
Roper et al., "Remote Sensing and GIS Applications for Pipeline Security Assesment", 2005 ESRI User Conference Proceedings, Nov. 2005, 13 pages.
Islam et al., "Development of flood hazard maps of Bangladesh using NOAA—A VHRR images with GIS", Hydrological Sciences-Journal-des Sciences Hydrologiques, 45(3), Jun. 2000, pp. 337-355.
Dewan et al., "Evaluating Flood Hazard for Land-Use Planning in Greater Dhaka of Bangladesh Using Remote Sensing and GIS Techniques", Copyright Springer Science + Business Media B.V. 2006, pp. 1601-1612.
Avinash Yentrapati, USPTO Office Action, U.S. Appl. No. 12/955,944, Mail Date Jan. 3, 2013, 20 pages.
Avinash Yentrapati, USPTO Final Office Action, U.S. Appl. No. 12/955,944, Notification Date May 2, 2013, 19 pages.
Avinash Yentrapati, USPTO Office Action, U.S. Appl. No. 12/955,944, Notification Date Sep. 9, 2013, 21 pages.
Avinash Yentrapati, USPTO Final Office Action, U.S. Appl. No. 12/955,944, Notification Date Jan. 16, 2014, 23 pages.
Avinash Yentrapati, USPTO Office Action, U.S. Appl. No. 12/955,944, Notification Date Jun. 19, 2014, 23 pages.
Avinash Yentrapati, USPTO Final Office Action, U.S. Appl. No. 12/955,944, Notification Date Aug. 21, 2014, 31 pages.
Avinash Yentrapati, USPTO Notice of Allowance and Fee(s) Due, U.S. Appl. No. 12/955,944, Date Mailed Sep. 3, 2014, 12 pages.
Avinash Yentrapati, USPTO Office Action, U.S. Appl. No. 14/504,691, Notification Date Dec. 18, 2014, 16 pages.
Avinash Yentrapati, USPTO Notice of Allowance and Fee(s) Due, U.S. Appl. No. 14/504,691, Date Mailed Apr. 7, 2015, 12 pages.
Tang Yanli, "The Application of GIS and RS for Coastline Change Detection and Risk Assessment to Enhanced Sea Level Rise", 2002, 82 pages.
Xiao Qi Zhi, "Information Materials for IDS", Date of CN Office Action Sep. 6, 2015, 4 pages.

* cited by examiner

HAZARD DETECTION FOR ASSET MANAGEMENT

RELATED U.S. APPLICATION DATA

This application is a continuation of, and claims the benefit of, co-pending and co-owned U.S. patent application Ser. No. 14/504,691, filed Oct. 2, 2014, the entire contents of which are herein incorporated by reference. This application is also related in some aspects to the commonly owned and issued U.S. Pat. No. 8,929,585, issued Jan. 6, 2015.

FIELD OF THE INVENTION

The present invention generally relates to infrastructure asset management. Specifically, the present invention provides an approach for automatically locating hazards in an infrastructure.

BACKGROUND OF THE INVENTION

Utilities companies have a significant challenge with outages, which may be caused by trees and other objects falling on overhead power lines. A significant part of the preventive maintenance budget is targeted to clearing trees. Utilities spend a significant amount of time trying to locate the exact location of tree damage that is causing a particular outage. These issues are both a financial burden and reduce the quality of service provided by utilities. Similar challenges exist with several other asset management disciplines like managing road networks, oil pipe networks, rail networks, etc., where the assessing the condition of the infrastructure and detecting potential hazards is critical to the safe and continuous operation of these infrastructures Many utilities store the location of their power lines, for example, in Geographic Information Systems (GIS). However utilities today use ad hoc manual techniques to assess where to dispatch crews, e.g., for tree trimming activity.

SUMMARY OF THE INVENTION

In one approach, there is a method for detecting locations of hazardous conditions within an infrastructure, comprising: analyzing visual media data containing asset location data about each of a plurality of physical assets to determine a hazardous condition for each of the plurality of physical assets; generating a plurality of visual overlay layers displayed atop a satellite image of the visual media, the visual overlay layers including a street address display, a display of one or more of the hazardous conditions, and an infrastructure display of an object associated with one or more of the hazardous condition; and generating a prioritized maintenance plan based on a ranked inventory of each of the hazardous conditions and the visual media data by determining a location of relevant road intersections and traffic control points based on the street address of the one or more hazardous conditions, and relaying the location of the relevant road intersections and traffic control points to maintenance personnel.

In a second approach, there is a system for detecting locations of hazardous conditions within an infrastructure comprising: at least one processing unit; memory operably associated with the at least one processing unit; and a hazard detection tool storable in memory and executable by the at least one processing unit, the hazard detection tool containing computer instructions, which when executed, cause the system to: analyze visual media data containing asset location data about each of a plurality of physical assets to determine a hazardous condition for each of the plurality of physical assets; generate a plurality of visual overlay layers displayed atop a satellite image of the visual media, the visual overlay layers including a street address display, a display of one or more of the hazardous conditions, and an infrastructure display of an object associated with one or more of the hazardous condition; and generate a prioritized maintenance plan based on a ranked inventory of each of the hazardous conditions and the visual media data by determining a location of relevant road intersections and traffic control points based on the street address of the one or more hazardous conditions, and relaying the location of the relevant road intersections and traffic control points to maintenance personnel.

In a third approach, there is a computer program product for detecting locations of hazardous conditions within an infrastructure, the computer program product comprising a computer readable storage device, and program instructions stored on the computer readable storage device to: analyze visual media data containing asset location data about each of a plurality of physical assets to determine a hazardous condition for each of the plurality of physical assets; generate a plurality of visual overlay layers displayed atop a satellite image of the visual media, the visual overlay layers including a street address display, a display of one or more of the hazardous conditions, and an infrastructure display of an object associated with one or more of the hazardous condition; and generate a prioritized maintenance plan based on a ranked inventory of each of the hazardous conditions and the visual media data by determining a location of relevant road intersections and traffic control points based on the street address of the one or more hazardous conditions, and relaying the location of the relevant road intersections and traffic control points to maintenance personnel.

Figure 1:
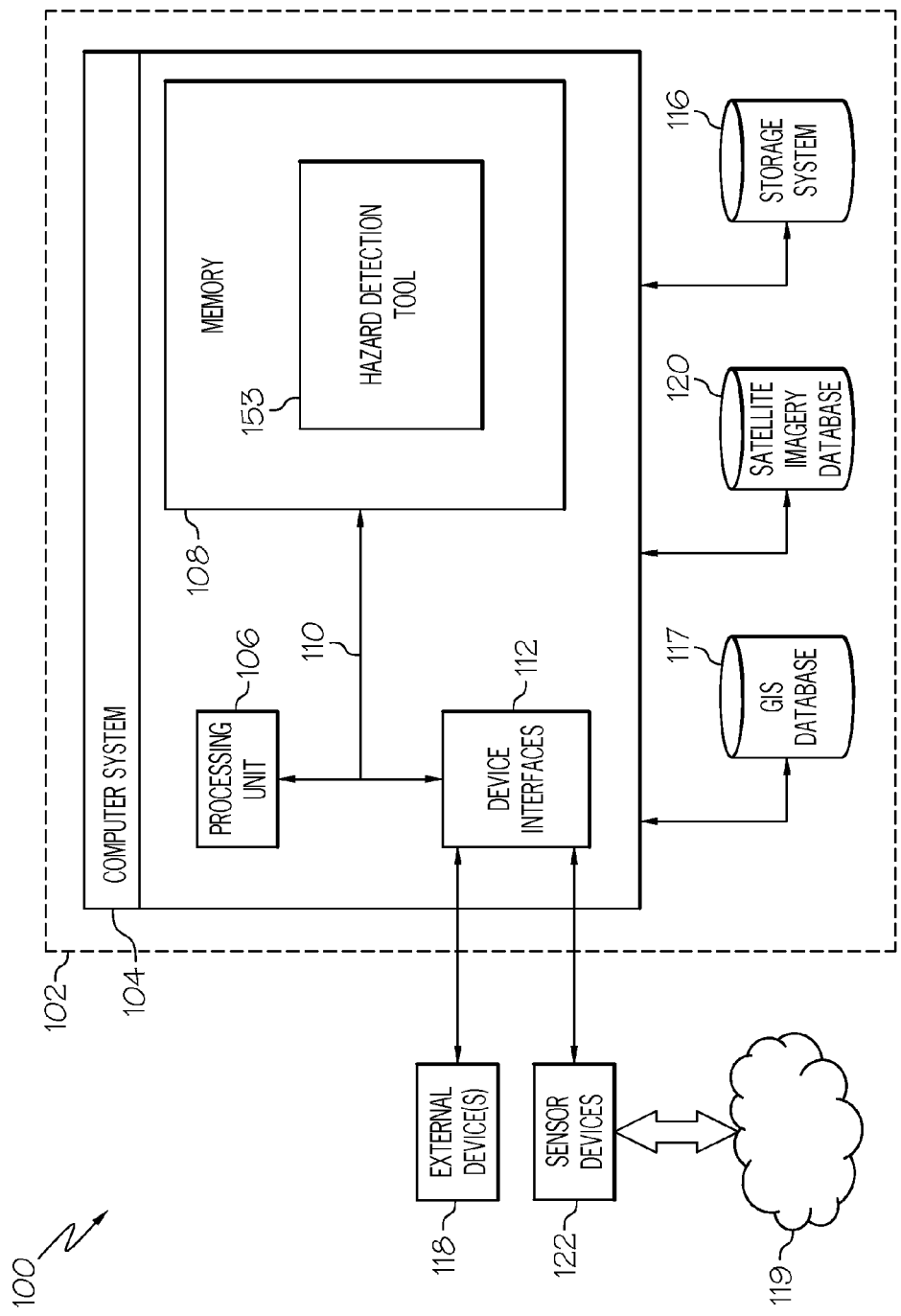
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of this invention are directed to automatically detecting locations of hazardous conditions within an infrastructure. This approach uses satellite imagery, GIS data, automatic image processing, and predictive modeling to determine the location of the hazards automatically, thus optimizing preventive maintenance management. In these embodiments, a hazard detection tool provides this capability. Specifically, the hazard detection tool comprises a detection component configured to: receive visual media containing asset location data about a set of physical assets, and hazard location data about potential hazards within a vicinity of each of the set of physical assets; and receive graphical information system (GIS) data containing asset location data about each of the set of physical assets. The hazard detection tool further comprises an analysis component configured to: analyze the visual media to determine if a hazardous condition exists for each of the set of physical assets; and apply the GIS data to the visual media to determine a location of hazardous conditions within the infrastructure.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for detecting locations of hazardous conditions within an infrastructure. It should be understood that any other computers implemented under the present invention may have different components/software, but will perform similar functions. As shown, computer system 104 includes a processing unit 106 capable of analyzing satellite and GIS data, and producing a usable output, e.g., images, compressed video and video meta-data. Also shown is memory 108 for storing a hazard detection tool 153, a bus 110, and device interfaces 112.

Figure 2:
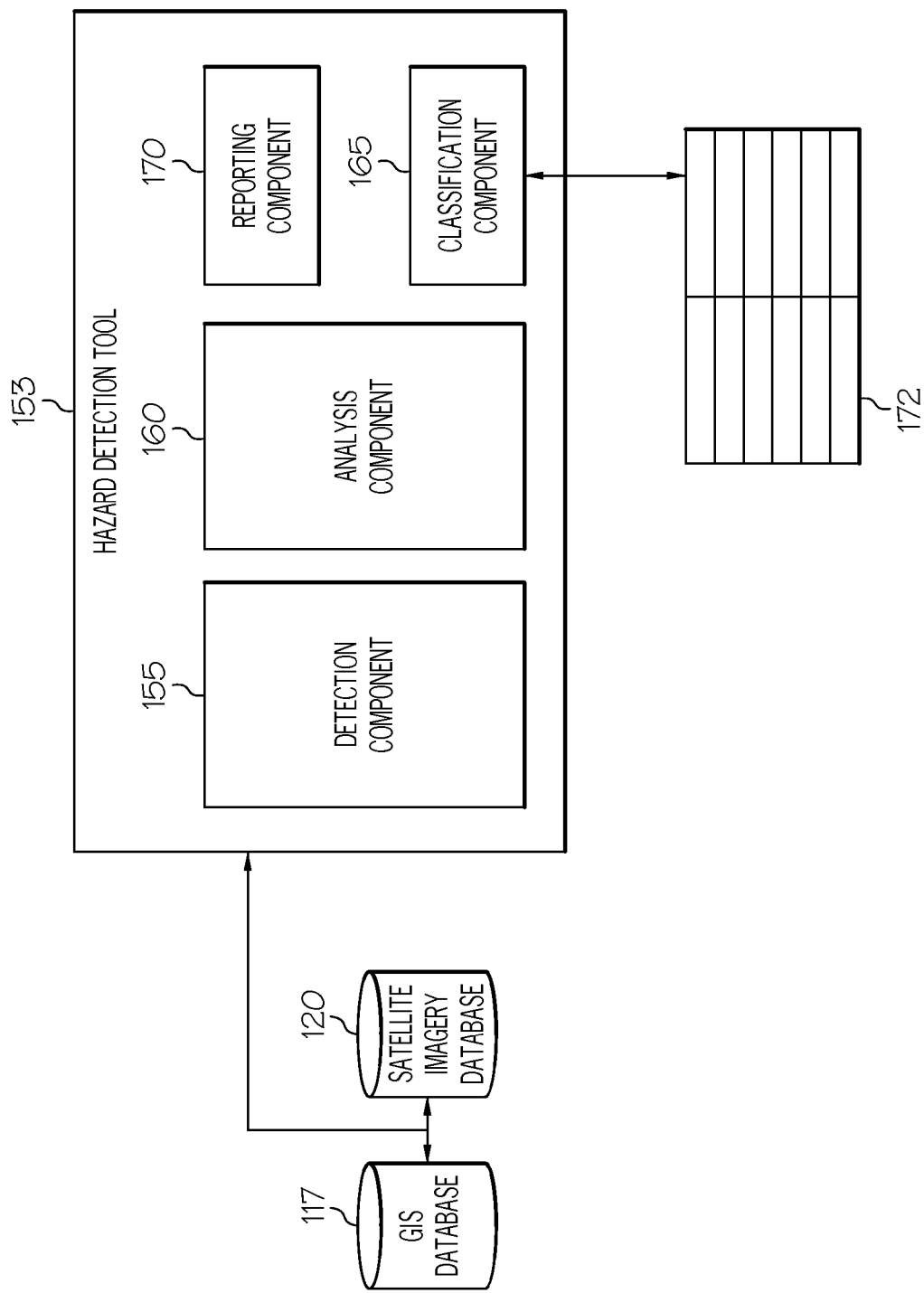
FIG. 2 shows a hazard detection tool that operates in the environment shown in FIG. 1.

Computer system 104 is shown communicating with a set (i.e., one or more) of sensor devices 122 (e.g., satellite imagery devices) that communicate with bus 110 via device interfaces 112. As shown in FIG. 2, sensor devices 122 monitor and receive visual information from a visual region of interest 119, which may include all or part of an infrastructure. In one embodiment, as will be further described below, the infrastructure may include a set of power lines operated by a utility company. Sensor devices 122 include one or more sensor devices for capturing image data representing visual attributes of assets (e.g., power lines) within the infrastructure, as well as attributes of other objects (e.g., trees) within visual region of interest 119. Sensor device 122 can include virtually any type of satellite imagery sensor capable of capturing visual attributes of objects with sufficient quality to support the methods of the invention as described herein.

Processing unit 106 (FIG. 1) collects and routes signals representing outputs from sensor devices 122 to hazard detection tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating hazard detection tool 153, which is stored in memory 108 and/or storage system 116. While executing computer program code, processing unit 106 can read and/or write data to/from memory 108 and storage system 116. Computer system 104 also operates with a GIS database 117, which contains location data about physical assets within the infrastructure, as well as satellite imagery database 120, which stores satellite data, including visual metadata generated by processing unit 106, as well as rules against which the metadata is compared to identify objects/assets and attributes of objects present within visual region of interest 119. Storage system 116, GIS database 117, and satellite imagery database 120 can include VCRs, DVRs, RAID arrays, USB hard drives, optical disk recorders, flash storage devices, image analysis devices, general purpose computers, video enhancement devices, de-interlacers, scalers, and/or other visual or data processing and storage elements for storing and/or processing visual media and GIS data.

Although not shown, computer system 104 could also include I/O interfaces that communicate with one or more external devices 118 that enable a user to interact with computer system 104 (e.g., a keyboard, a pointing device, a display, etc.). In one embodiment, hazardous conditions within an infrastructure are output to an operator who prioritizes the dispatch of preventive maintenance personnel.

Figure 3:
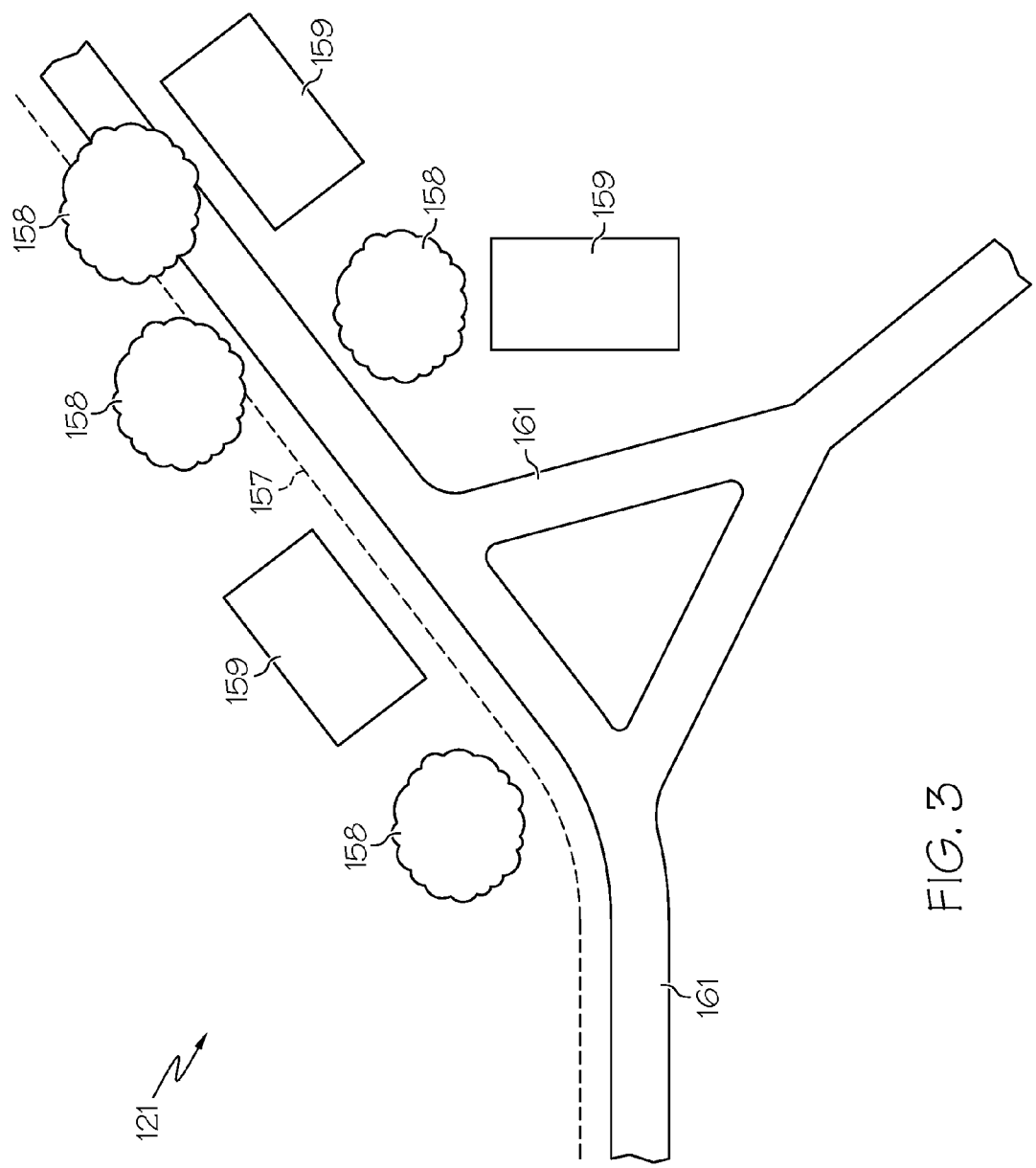
FIG. 3 shows an overhead-view representation of a set of assets within an infrastructure according to embodiments of the invention.

Turning now to FIGS. 2-3, hazard detection tool 153 according to embodiments of the invention will be described in greater detail. Hazard detection tool 153 (FIG. 2) comprises a detection component 155 configured to receive visual media 121, e.g., an overhead satellite image, which is represented in FIG. 3. As shown, visual media 121 contains asset location data about a set of physical assets 157, and hazard location data about potential hazards 158 within a vicinity of each of the set of physical assets 157. Specifically, detection component 155 receives visual media 121 (e.g., one or more satellite images via satellite imagery database 120) depicting assets 157 and hazards 158 along a roadway 161, as well as other physical structures 159, e.g., buildings. In this non-limiting example, asset 157 comprises an above-ground power line, and hazards 158 comprise trees that are within a vicinity (i.e., a predetermined distance) of the power lines. To determine whether a hazardous condition exists for each of the assets 157, that is, to determine whether the trees are within an unacceptable distance to the power lines, the satellite image is processed and analyzed. To accomplish this, detection component 153 comprises an analysis component 160 configured to analyze visual media 121 to determine if a hazardous condition exists for each of set of physical assets 157.

In one embodiment, analysis component 160 performs automatic image processing on visual media 121 to determine whether a hazardous condition exists based on the proximity of assets 157 and potential hazards 158. To accomplish this, the automatic image processing performed by analysis component 160 comprises at least one of the following: background modeling, object detection, spatial intensity field gradient analysis, line detection, and texture detection. However, it will be appreciated that many types of automatic image processing are possible within the scope of the invention to determine the location, edges, attributes, etc. of assets 157 and potential hazards 158. In one embodiment, the image processing performed by analysis component 160 may be configured to detect and locate edges or boundary positions of assets 157 and potential hazards 158 based on a number of different characteristics of the satellite image, such as texture, intensity, color, etc. The image processing performs, for example, a texture-based edge-finding operation, along with an intensity gradient edge-locating operation to determine the existence of hazardous conditions that may require attention from an operator of infrastructure based on a classification/severity of the hazardous condition. Furthermore, the automatic image processing is capable of detecting changes in tree appearance, which may indicate tree damage and the possibility of a hazardous condition.

Figure 4:
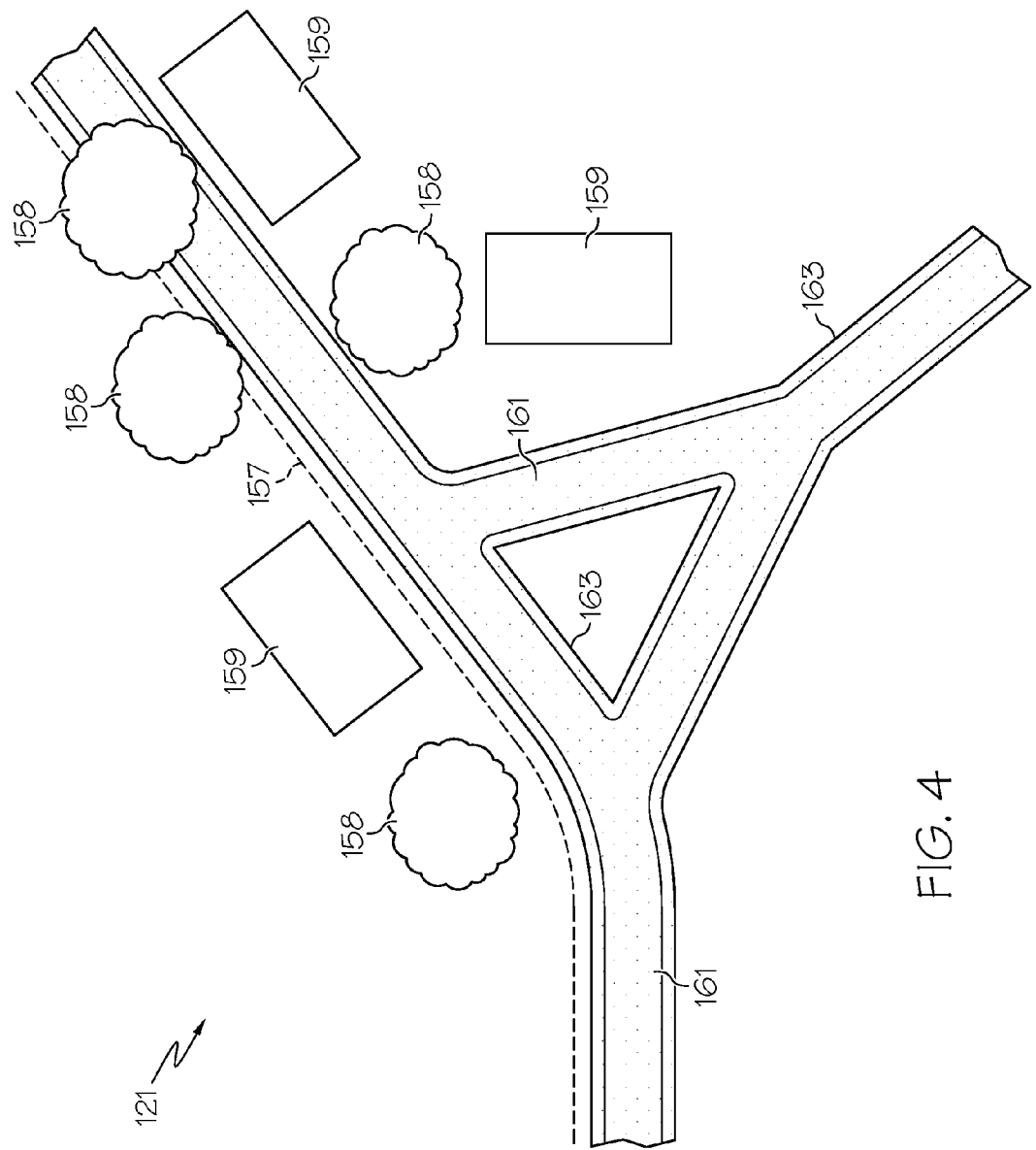
FIG. 4 shows a GIS overlay applied to the representation of a set of assets within an infrastructure according to embodiments of the invention.

Turning now to FIG. 4, an approach for determining the location of hazardous conditions based on GIS data will be described in further detail. As shown, in one embodiment, detection component 155 of hazard detection component 153 (FIG. 2) is configured to receive GIS data containing asset location information about each of set of physical assets 157. GIS data is commonly presented in the form of a visual map, which provides "layers" of information. GIS maps combine layers of information about a given asset or location, thereby providing an infrastructure operator with a better understanding of specific locations in the infrastructure. In this example, GIS data is represented as a visual overlay 163, which provides information about the location of objects such as power lines, buildings, streets, sewers, lamp posts, etc., as well as information about the objects themselves.

Analysis component 160 is configured to apply the GIS data to visual media 121 to determine a location of hazardous conditions within the infrastructure. For example, analysis component 160 may operate with a computer-executable GIS extension application interfaced with GIS database 117 to locate trees within a close proximity to the power line assets of the infrastructure. FIG. 4 illustrates such an approach, which includes visual media 121 (i.e., a satellite image) displaying basic geographic features, including assets 157 and potential hazards 158, about an area being monitored. Analysis component 160 generates visual overlay 163 containing street address information, which may be displayed, thereby presenting a detailed view of the location of infrastructure assets and hazardous conditions.

In the event that a potentially hazardous condition exists based on the analyzing, the information will be received by hazard detection tool 153 by any of various means. Again, for purposes of this disclosure, the event is assumed to be a tree in close proximity or covering a power line, or a tree with a recently changed appearance. In this embodiment, hazard detection tool 153 displays to an operator the location (e.g., the address) on the map of the potentially hazardous condition. In one embodiment, hazard detection tool 153 determines the location of relevant road intersections or traffic control points, which can be relayed to the appropriate maintenance personnel.

As shown in FIG. 2, hazard detection tool further comprises a classification component 165 configured to classify and list the location of each of the hazardous conditions. In one embodiment, classification component 165 receives a plurality of detected hazardous conditions in a ranked list 172 that is based on the severity of the hazard. For example, a section of the power line having multiple and/or large trees within a close proximity may be given priority over a section of the power line surrounded by fewer trees. Based on the severity of the hazard, any number of responses may be generated within the scope of the invention. To accomplish this, hazard detection tool 153 further comprises a response component 170 configured to generate a response based on the classification of the hazardous condition. Based on ranked list 172 providing locations of ranked by degree of hazard, response component 170 (or an infrastructure operator) prioritizes the dispatch of crews to the exact location for corrective maintenance.

It can be appreciated that the methodologies disclosed herein can be used within a computer system to detect locations of hazardous conditions within an infrastructure, as shown in FIG. 1. In this case, hazard detection tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
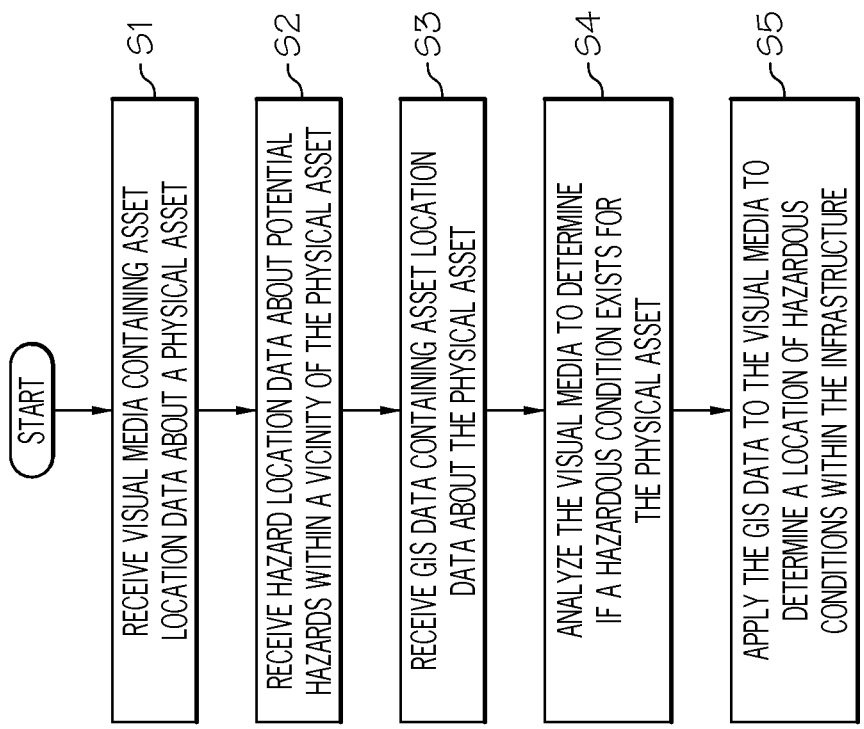
FIG. 5 shows a flow diagram of an approach for detecting hazards within an infrastructure according to embodiments of the invention.

The program modules carry out the methodologies disclosed herein, as shown in FIG. 5. According to one embodiment, at S1 visual media containing asset location data about a physical asset is received. At S2, hazard location data about potential hazards within a vicinity of the physical asset is received. At S3, GIS data containing asset location data about the physical asset is received. At S4, the visual media is analyzed to determine if a hazardous condition exists for the physical asset. At S5, the GIS data is applied to the visual media to determine a location of hazardous conditions within the infrastructure.

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

Furthermore, an implementation of exemplary computer system 104 (FIG. 1) may be stored on or transmitted across some form of computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is apparent that there has been provided with this invention an approach for detecting locations of hazardous conditions within an infrastructure. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:
1. A method for detecting locations of hazardous conditions within an infrastructure, comprising:
  analyzing visual media data containing asset location data about each of a plurality of physical assets;
  processing a set of the visual media data using a texture-based edge-finding operation and an intensity gradient edge-locating operation to detect a boundary position of each physical asset of the plurality of physical assets and a boundary position of a set of hazardous conditions;

locating the boundary of each physical asset and the boundary of each hazardous condition on a satellite image;

identifying, based on the locating, a proximity of the boundary of each hazardous condition to the boundary of each physical asset;

detecting damage to an asset of the plurality of physical assets based on a change in appearance indicating damage to that asset;

assessing, based on the identified proximity and the detected damage, a threat each hazardous condition poses to each physical asset;

generating, from the analyzed visual media data, a plurality of visual overlay layers displayed atop the satellite image, the visual overlay layers including a street address display, a display of one or more of the hazardous conditions, and an infrastructure display of a physical asset of the plurality of physical assets associated with the one or more of the hazardous conditions; and generating a prioritized maintenance plan based on a ranked inventory of each of the hazardous conditions, the threat each hazardous condition poses to each physical asset, and the visual media data by determining a location of relevant road intersections and traffic control points based on the street address of the one or more hazardous conditions, and relaying the location of the relevant road intersections and traffic control points to maintenance personnel.

2. The method according to claim 1, further comprising receiving visual media containing asset location data about a plurality of physical assets, and hazard location data about potential hazards within a vicinity of each of the plurality of physical assets.

3. The method according to claim 1, further comprising ranking each of the hazardous conditions based on severity.

4. The method according to claim 1, the analyzing the visual media data to determine a hazardous condition for each of the plurality of physical assets comprising identifying a hazardous condition in the case that an object in vicinity to one or more of the physical assets has a recent change in appearance.

5. The method according to claim 4, the identifying the hazardous condition comprising performing automatic image processing.

6. The method according to claim 5, the automatic image processing comprising at least one of the following: background modeling, object detection, spatial intensity field gradient analysis, line detection, and texture detection.

7. The method according to claim 1, the analyzing the visual media data to determine a hazardous condition for each of the plurality of physical assets further comprising determining a physical proximity of a hazardous condition to one or more of the physical assets.

8. A system for detecting locations of hazardous conditions within an infrastructure comprising:
at least one processing unit;
memory operably associated with the at least one processing unit; and
a hazard detection tool storable in memory and executable by the at least one processing unit, the hazard detection tool containing computer instructions, which when executed, cause the system to:
analyze visual media data containing asset location data about each of a plurality of physical assets;
process a set of the visual media data using a texture-based edge-finding operation and an intensity gradient edge-locating operation to detect a boundary position of each physical asset of the plurality of physical assets and a boundary position of a set of hazardous conditions;
locate the boundary of each physical asset and the boundary of each hazardous condition on a satellite image;
identify, based on the located boundaries, a proximity of the boundary of each hazardous condition to the boundary of each physical asset;
detect damage to an asset of the plurality of physical assets based on a change in appearance indicating damage to that asset;
assess, based on the identified proximity and the detected damage, a threat each hazardous condition poses to each physical asset;
generate, from the analyzed visual media data, a plurality of visual overlay layers displayed atop the satellite image, the visual overlay layers including a street address display, a display of one or more of the hazardous conditions, and an infrastructure display of a physical asset of the plurality of physical assets associated with the one or more of the hazardous conditions; and
generate a prioritized maintenance plan based on a ranked inventory of each of the hazardous conditions, the threat each hazardous condition poses to each physical asset, and the visual media data by determining a location of relevant road intersections and traffic control points based on the street address of the one or more hazardous conditions, and relaying the location of the relevant road intersections and traffic control points to maintenance personnel.

9. The system according to claim 8, the computer instructions further causing the system to receive visual media containing asset location data about a plurality of physical assets, and hazard location data about potential hazards within a vicinity of each of the plurality of physical assets.

10. The system according to claim 8, the computer instructions further causing the system to rank each of the hazardous conditions based on severity.

11. The system according to claim 8, the computer instructions causing the system to analyze the visual media data to determine a hazardous condition for each of the plurality of physical assets further causing the system to identify a hazardous condition in the case that an object in vicinity to one or more of the physical assets has a recent change in appearance.

12. The system according to claim 11, the computer instructions causing the system to identify the hazardous condition further causing the system to perform automatic image processing.

13. The system according to claim 12, the automatic image processing comprising at least one of the following: background modeling, object detection, spatial intensity field gradient analysis, line detection, and texture detection.

14. The system according to claim 8, the computer instructions further causing the system to determine a physical proximity of a hazardous condition to one or more of the physical assets.

15. A computer program product for detecting locations of hazardous conditions within an infrastructure, the computer program product comprising a computer readable storage device, and program instructions stored on the computer readable storage device, to:
analyze visual media data containing asset location data about each of a plurality of physical assets;

process a set of the visual media data using a texture-based edge-finding operation and an intensity gradient edge-locating operation to detect a boundary position of each physical asset of the plurality of physical assets and a boundary position of a set of hazardous conditions;

locate the boundary of each physical asset and the boundary of each hazardous condition on a satellite image;

identifying, based on the located boundaries, a proximity of the boundary of each hazardous condition to the boundary of each physical asset;

detect damage to an asset of the plurality of physical assets based on a change in appearance indicating damage to that asset;

assess, based on the identified proximity and the detected damage, a threat each hazardous condition poses to each physical asset;

generate, from the analyzed visual media data, a plurality of visual overlay layers displayed atop the satellite image, the visual overlay layers including a street address display, a display of one or more of the hazardous conditions, and an infrastructure display of a physical asset of the plurality of physical assets associated with the one or more of the hazardous conditions; and generate a prioritized maintenance plan based on a ranked inventory of each of the hazardous conditions and the visual media data by determining a location of relevant road intersections, the threat each hazardous condition poses to each physical asset, and traffic control points based on the street address of the one or more hazardous conditions, and relaying the location of the relevant road intersections and traffic control points to maintenance personnel.

16. The computer program product of claim 15, further comprising program instructions to receive visual media containing asset location data about a plurality of physical assets, and hazard location data about potential hazards within a vicinity of each of the plurality of physical assets.

17. The computer program product of claim 15, further comprising program instructions to rank each of the hazardous conditions based on severity.

18. The computer program product of claim 15, further comprising program instructions to analyze the visual media data to determine a hazardous condition for each of the plurality of physical assets further causing the system to identify a hazardous condition in the case that an object in vicinity to one or more of the physical assets has a recent change in appearance.

19. The computer program product of claim 18, further comprising program instructions to perform automatic image processing.

20. The computer program product of claim 19, the automatic image processing comprising at least one of the following: background modeling, object detection, spatial intensity field gradient analysis, line detection, and texture detection.

* * * * *